US006144283A

United States Patent [19]
Matsumura

[11] Patent Number: 6,144,283
[45] Date of Patent: Nov. 7, 2000

[54] TEMPERATURE DETECTABLE LARGE-CURRENT FUSE AND METHOD OF ASSEMBLING THE SAME

[75] Inventor: Norio Matsumura, Shizuoka, Japan

[73] Assignee: Yazaki Corporation, Tokyo, Japan

[21] Appl. No.: 09/311,754

[22] Filed: May 14, 1999

[30] Foreign Application Priority Data

May 19, 1998 [JP] Japan .................................. 10-136912

[51] Int. Cl.[7] ..................... H01H 85/055; H01H 85/044; H01H 37/76; H01H 69/02; H02H 5/04

[52] U.S. Cl. .......................... 337/198; 337/185; 337/166; 337/405; 337/406; 361/104; 439/622; 29/623

[58] Field of Search .................................... 337/186, 185, 337/198, 166, 232, 296, 297, 401–407, 163, 182, 229, 183, 184; 361/104; 439/621, 622; 29/623

[56] References Cited

U.S. PATENT DOCUMENTS

| | | | |
|---|---|---|---|
| 3,786,388 | 1/1974 | Sato | 337/269 |
| 3,931,602 | 1/1976 | Plasko | 337/163 |
| 4,184,139 | 1/1980 | Hara | 337/407 |
| 4,352,082 | 9/1982 | Barry et al. | 337/409 |
| 4,494,104 | 1/1985 | Holmes | 337/403 |
| 5,014,036 | 5/1991 | Komoto | 337/407 |
| 5,097,247 | 3/1992 | Doerrwaechter | 337/405 |
| 5,150,093 | 9/1992 | Gurevich | 337/163 |
| 5,192,940 | 3/1993 | Yajima et al. | 338/308 |
| 5,343,192 | 8/1994 | Yenisey | 340/639 |
| 5,406,244 | 4/1995 | Thwaites et al. | 337/163 |
| 5,682,057 | 10/1997 | Kuriyama | 257/529 |
| 5,963,122 | 10/1999 | Endo et al. | 337/198 |
| 6,011,458 | 1/2000 | Endo et al. | 337/198 |

FOREIGN PATENT DOCUMENTS

| | | | |
|---|---|---|---|
| 2-88467 | 3/1990 | Japan | C04B 35/58 |
| 4-4539 | 1/1992 | Japan | H01H 61/02 |
| 9-223450 | 8/1997 | Japan | H01H 85/143 |

*Primary Examiner*—Leo P. Picard
*Assistant Examiner*—Anatoly Vortman
*Attorney, Agent, or Firm*—Sughrue, Mion, Zinn, Macpeak & Seas, PLLC

[57] ABSTRACT

A temperature detectable current fuse comprises a temperature detecting fuse having a fusible portion, a current fuse having a fusible portion and a table portion provided at the fusible portion thereof, on which the fusible portion of the temperature detecting fuse is mounted, and a housing having a chamber into which the temperature detecting fuse and the current fuse are inserted through an opening of the chamber.

7 Claims, 3 Drawing Sheets

TEMPERATURE DETECTABLE LARGE-CURRENT FUSE AND METHOD OF ASSEMBLING THE SAME

BACKGROUND OF THE INVENTION

This invention relates to a large-current fuse having a temperature detection function, in which a temperature detecting fuse for detecting the temperature of a current fuse (main fuse) is provided in the vicinity of a fusible portion of the main fuse. This invention also relates to a method of assembling this fuse.

In a large-current fuse used in a vehicle or the like, its fusible portion is immediately melted when an electric current, larger than 200% of the rated current of the fuse, flows through the fuse. When a current, less than 200% of the rated current of the fuse, flows, the melting time is relatively long since the fuse is designed to withstand a rush current. When not a continuous current but a current as produced at the time of intermittent short-circuiting (rare short-circuiting) flows, the fusible portion of a fuse element repeatedly generates and radiates heat in an element chamber, and the melting time tends to become long. On the other hand, even when an intermittent short-circuiting current flows through a wire constituting a circuit, and the wire does not radiate heat at the time of interruption of the current unlike the fusible portion since the wire is covered with a sheath, and therefore the temperature of the wire continues to rise since the heat is accumulated therein, and in the worst case, there is a possibility that smoke is produced from the wire.

In order to overcome this disadvantage, there has been proposed a large-current fuse having a temperature detection function (hereinafter, a temperature detectable fuse) as shown in. FIG. 5. The temperature detectable fuse 1 comprises a current fuse 3 for being activated by an excessive current, and a temperature detecting fuse 5 for being activated by the ambient temperature, and the two fuses 3 and 5 are mounted in a housing (not shown).

Claws 11, extending from a fuse element 9 of the current fuse 3, are bent or pressed to clamp the temperature detecting fuse 5, thereby holding the temperature detecting fuse 5 on the fuse element 9. Male terminals 13 of the temperature detecting fuse 5 extend outwardly from the housing. The activating temperature of the temperature detecting fuse 5 is set to a value between the maximum temperature, which can develop in a normal condition of use of the current fuse 3, and the activating temperature of the current fuse 3.

In this temperature detectable fuse 1, even at the time of rare short-circuiting when the current fuse 3 is not melted, the temperature detecting fuse 5 is melted to generate a melting signal, so that the circuit can be broken or an alarm can be given to the driver by the signal.

In the above related temperature detectable fuse, however, since the clamping process of the claws can not be carried out so easily, there has been encountered a problem that the productivity is low. And besides, the clamping is conducted after the current fuse and the temperature detecting fuse are inserted into the housing, and therefore the shape of a clamping tool is limited, and the processing has been difficult. If the current fuse and the temperature detecting fuse are beforehand connected together by the clamping, and are mounted in the housing, many terminals must be mounted simultaneously in the housing, which has resulted in a problem that the productivity is low.

In the above related temperature detectable fuse, the temperature detecting fuse is made into a shape of male terminals, and therefore female terminals must be provided in a mating fuse box, which has resulted in a problem that the construction of the fuse box is complicated.

SUMMARY OF THE INVENTION

It is therefore an object of the present invention to provide a temperature detectable large-current fuse, in which a temperature detecting fuse can be easily mounted on a current fuse without conducting the clamping process, and besides a mating fuse box can be simplified in construction. Another object of the present invention is to provide a method of assembling this large-current fuse.

In order to achieve the above object, a temperature detectable current fuse comprising: a temperature detecting fuse having a fusible portion; a current fuse having a fusible portion and a table portion provided at the fusible portion thereof, on which the fusible portion of the temperature detecting fuse is mounted; and a housing having a chamber into which the temperature detecting fuse and the current fuse are inserted through an opening of the chamber.

The table portion is provided at a longitudinal end portion of a radiator fin perpendicularly extending from the fusible portion of the current fuse.

In the structure, the temperature detecting fuse is mounted on the table portion of the current fuse by simply attaching the temperature detecting fuse to the housing in which the current fuse has been already attached therein. Therefore, the fuse element of the current fuse, which is separate from the temperature detecting fuse, is held in intimate contact with the temperature detecting fuse without conducting the clamping process.

The temperature detectable current fuse further comprises a cover detachable to the housing for closing the opening of the chamber, the cover has a fuse holder for abutting and pressing against the fusible portion of the temperature detecting fuse on the table portion of the current fuse when the cover is attached to the housing.

In the structure, the fuse holder abuts and presses against the temperature detecting fuse by simply attaching the cover to the housing. Accordingly, the fuse element of the current fuse and the temperature detecting fuse are positively held in intimate contact with each other without conducting the clamping process.

In the fuse, a terminal of the current fuse which is to be connected with a mating terminal in a mating fuse box may be a female terminal.

In the fuse, a terminal of the temperature detecting fuse which is to be connected with a mating terminal in a mating fuse box may be a female terminal.

Accordingly, all of the mating terminals in the mating fuse box are of the male type. Therefore, the construction of the mating fuse box can be simplified. The cover may have a rib which can be engaged with the temperature detecting fuse only when the temperature detecting fuse is completely inserted into the chamber and the cover can be attached to the housing only when the rib is engaged with the temperature detecting fuse.

Accordingly, the temperature detecting fuse can be retained more stably. In addition, the half insertion of the temperature detecting fuse can also be detected.

The above temperature detectable current fuse is assembled a method comprising the steps of: inserting the current fuse into the chamber though the opening such that the current fuse is attached therein; inserting the temperature detecting fuse into the chamber through the opening such that the fusible portion thereof is mounted on the table portion of the current fuse; and attaching the cover to the housing such that the fuse holder abuts against the fusible portion of the temperature detecting fuse on the table portion of the current fuse.

Accordingly, merely by mounting the current fuse and the temperature detecting fuse sequentially without conducting the clamping process, the current fuse and the temperature detecting fuse can be held in intimate contact with each other.

DETAILED DESCRIPTION OF THE PREFERRED EMBODIMENTS

A preferred embodiment of a temperature detectable large-current fuse, as well as a method of assembling this fuse, will now be described in detail with reference to the drawings.

Figure 1:
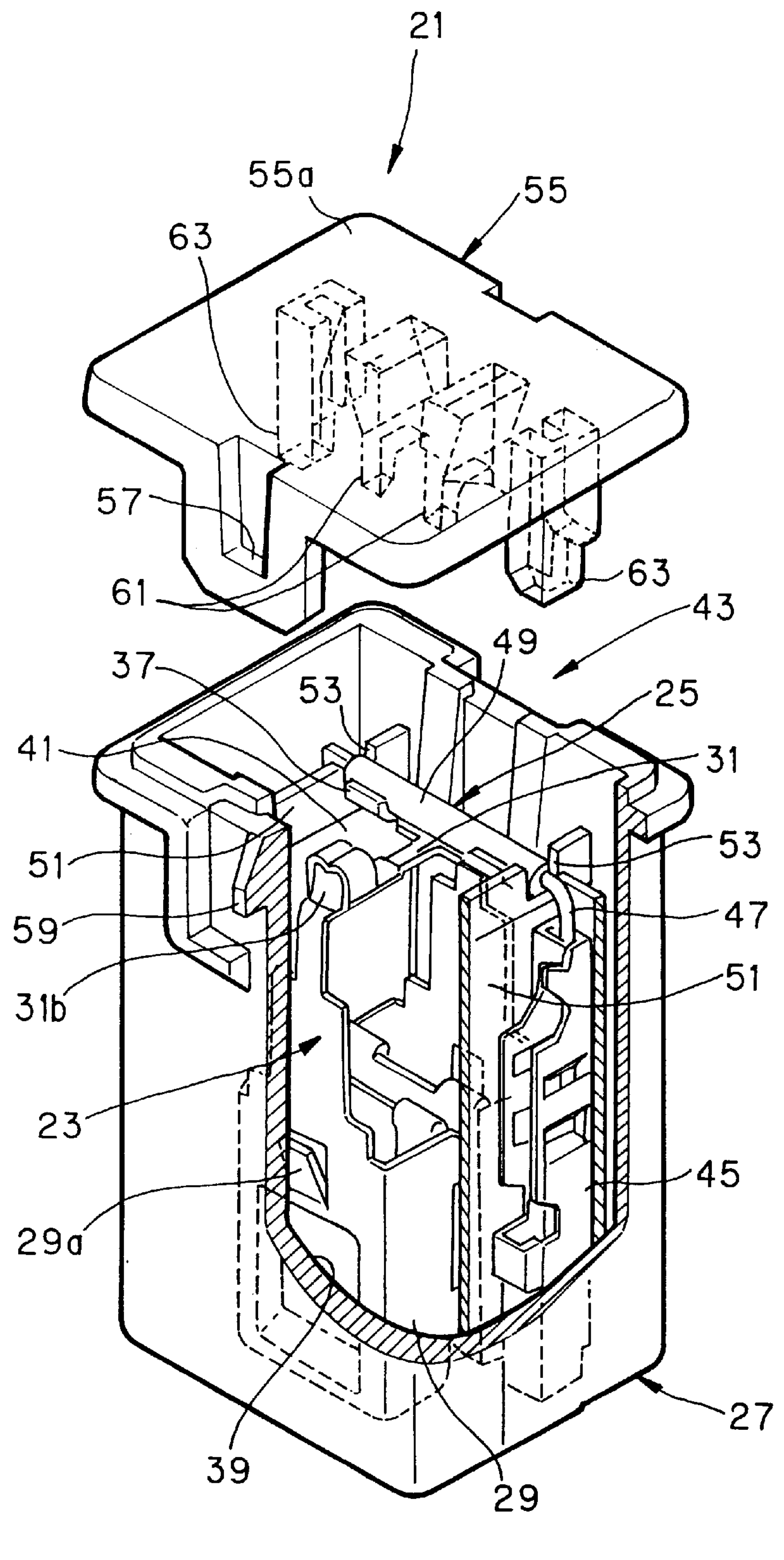
FIG. 1 is a partly-broken, exploded perspective view showing a temperature detectable large-current fuse according to the present invention.
Figure 2:
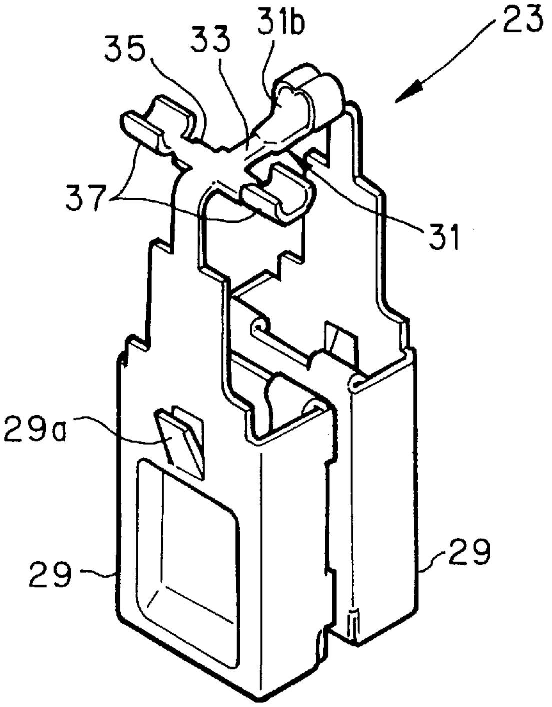
FIG. 2 is a perspective view of a current fuse shown in FIG. 1.
Figure 3:
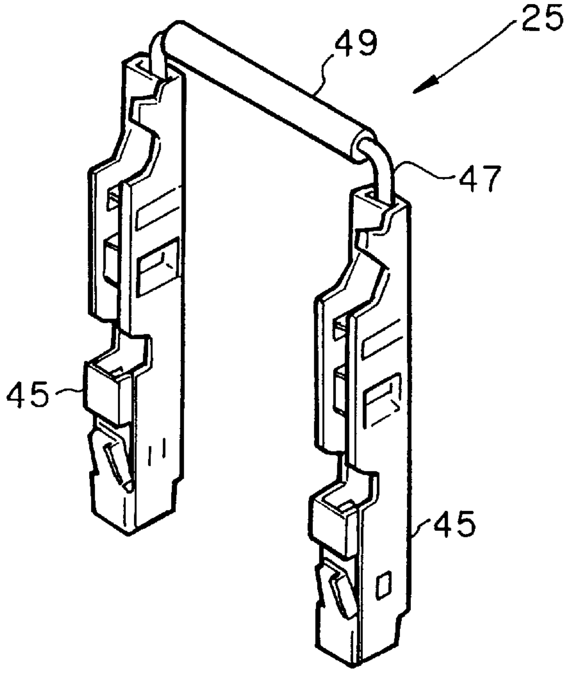
FIG. 3 is a perspective view of a temperature detecting fuse shown in FIG. 1.

FIG. 1 is a partly-broken, exploded perspective view of the temperature detectable large-current fuse according to the present invention, FIG. 2 is a perspective view of a current fuse shown in FIG. 1, and FIG. 3 is a perspective view of a temperature detecting fuse shown in FIG. 1.

The temperature detectable large-current fuse 21 comprises the current fuse 23 for being activated by an excessive current, and the temperature detecting fuse 25 for being activated by the ambient temperature, and the two fuses 23 and 25 are mounted within a housing 27.

As shown in FIG. 2, the current fuse 23 includes a pair of female terminals 29 interconnected by a fuse element 31. The fuse element 31 has a fusible portion 33, and when an excessive current flows between the female terminals 29, the fusible portion 33 is melted by heat generated by this excessive current. When the fusible portion 33 is thus melted, a circuit is opened, thereby protecting wires and an equipment.

Radiator fin 35 is formed on and extends from the fuse element 31 of the current fuse 23 in a direction perpendicular to the direction of the length of the fuse element 31. The radiator fin 35 is in the form of a narrow elongate piece. Table portions 37 on which the temperature detecting fuse 25 is placed, each having a concave curved surface directed upwardly, are formed respectively at both longitudinal ends of the radiator fin 35.

A terminal chamber 39 for receiving the female terminals 29, as well as element chambers 41 communicating with this terminal chamber 39, are formed within the housing 27. The fuse element 31 is disposed in the element chamber 41, with the female terminals 29 received in the terminal chamber 39.

The housing 27 has an opening 43 through which the current fuse 23 and the temperature detecting fuse 25 are inserted into the housing 27. The current fuse 23 is first inserted into the housing 27, and then the temperature detecting fuse 25 is inserted into the housing 27 through the opening 43. As shown in FIG. 3, the temperature detecting fuse 25 has a pair of female crimp terminals 45. Proximal ends of the crimp terminals 45 are interconnected by a fuse wire 47. An insulating pipe 49 is fitted on the fuse wire 47.

The temperature detecting fuse 25 is mounted within the housing 27, with the fuse wire 47 disposed perpendicularly to the fuse element 31 of the current fuse 23. The insulating pipe 49 of the temperature detecting fuse 25, mounted within the housing 27, rests on the table portions 37 of the current fuse 23.

A pair of partition walls 51 are formed within the housing 27, and are disposed inwardly of the crimp terminals 45, respectively. A channel-shaped notch 53 which opens upwardly is formed in an upper end of each partition wall 51. These notches 53 support the opposite ends of the insulating pipe 49 of the fuse wire 47, mounted within the housing 27, respectively.

When the current fuse 23 and the temperature detecting fuse 25 are mounted within the housing 27, the fusible portion 33 and the fuse wire 47 are disposed in intimate contact with each other through the insulating pipe 49. The female terminals 29 of the current fuse 23, mounted within the housing 27, as well as the female crimp terminals 45 of the temperature detecting fuse 25 mounted within the housing 27, are open toward the lower side of the housing 27.

The activating temperature of the temperature detecting fuse 25 is set to a value lower than the activating temperature of the current fuse 23. Namely, the activating temperature of the temperature detecting fuse 25 is set to a value between the maximum temperature, which can develop in a normal condition of use of the current fuse 23, and the activating temperature of the current fuse 23. For example, if the maximum temperature, which can develop in the normal condition of use of the current fuse 23, is 50° C., and its activating temperature is 300° C., then the activating temperature of the temperature detecting fuse 25 is so set that the temperature detection 25 can be activated at a temperature in the range of between 50° C. and 300° C.

A cover 55 is attached to the opening 43 of the housing 27. The cover 55 includes a base plate 55*a* of a square shape. Frame-like retaining portions 57 are formed on and extend downwardly from the base plate 55*a*, and are disposed immediately adjacent to opposite parallel sides of the base plate 55*a*, respectively. The retaining portions 57 are retainingly engageable respectively with retaining projections 59 formed respectively on opposite side surfaces of the housing 27. The cover 55 is attached to the housing 27 to cover the opening 43.

Temperature fuse holders 61, each having a downwardly-open recess, are formed on and project from the lower surface of the cover 55. When the cover 55 is attached to the housing 27, the recessed portions of the temperature fuse holders 61 fit on the insulating pipe 49 of the temperature detecting fuse 25. Namely, the insulating pipe 49 of the temperature detecting fuse 25 is held by the table portions 37 of the current fuse 23 and the fuse holders 61.

Ribs 63 are formed on and extend downwardly from the lower surface of the cover 55, and the temperature fuse holders 61 are disposed between the two ribs 63. When the cover 55 is attached to the housing 27, the ribs 63 retain the crimp terminals 45, respectively. Namely, when the cover 55 is attached to the housing 27, the fuse wire 47 of the temperature detecting fuse 25 is positively held in intimate contact with the fuse element 31. Since the ribs 63 retain the crimp terminals 45, respectively, the half insertion of the temperature detecting fuse 25 is prevented, and also the force of retaining of the temperature detecting fuse 25 is increased.

Next, the procedure of assembling the temperature detectable fuse of the above construction will be described.

For assembling the temperature detectable fuse 21, the current fuse 23 is first inserted into the housing 27 through the opening 43. Retaining piece portions 29*a* of the female terminals 29 are retainingly engaged respectively with retaining portions (not shown) provided within the housing 27.

Then, the temperature detecting fuse 25 is inserted into the housing 27 through the opening 43. The temperature detecting fuse 25 is inserted into the housing in such a manner that the insulating pipe 49 is disposed perpendicularly to the fuse element 31, and simultaneously when the temperature detecting fuse 25 is mounted within the housing 27, the insulating pipe 49 is placed on the table portions 37 disposed in the element chamber 41. At the same time, the opposite ends of the insulating pipe 49 are supported respectively by the notches 53 formed respectively in the upper ends of the partition walls 51.

After the current fuse 23 and the temperature detecting fuse 25 are mounted within the housing, the cover 55 is attached to the opening 43 of the housing 27. As a result of attachment of the cover 55 to the opening 43, the temperature fuse holders 61, formed on the lower surface of the cover 55, cooperate with the table portions 37 to hold the insulating pipe 49 therebetween. Therefore, the fuse wire 47 is held in intimate contact with the fuse element 31 through the insulating pipe 49.

The ribs 63 retain the crimp terminals 45 of the temperature detecting fuses 25, respectively, and the retaining force of the crimp terminals 45 is increased.

In this temperature detectable fuse 21, the table portions 37 are formed utilizing the radiator fin 35 of the current fuse 23, and the fuse wire 47 of the temperature detecting fuse 25 is placed on the table portions 37. The temperature fuse holders 61 for pressing the fuse wire 47, resting on the table portions 37, against the table portions 37 are formed on the cover 55. With this construction, the current fuse 23 is mounted in the housing, and then the temperature detecting fuse 25 is mounted in the housing, and further the cover 55 is attached to the opening 43. By doing so, the large-current fuse can be assembled in such a manner that the fusible portion 33 of the current fuse 23 and the fuse wire 47 of the temperature detecting fuse 25 are held in intimate contact with each other without conducting the clamping process.

The terminals of the current fuse 23, as well as the terminals of the temperature detecting fuse 25, are of the female type, and thus all of terminals of a mating fuse box (not shown), to which the temperature detectable fuse 21 is to be connected, are of the male type. Therefore, the construction of the mating fuse box can be simplified.

In the temperature detectable fuse 21, when the temperature of the fuse element 31 reaches about 300° C., tin 31*b* begins to diffuse into the fuse element matrix, and thereafter the fusible portion 33 is melted. On the other hand, in the event of intermittent short-circuiting (rare short-circuiting), the temperature of the fuse element 31 rises only to about 150° C., and therefore the current fuse 23 is not melted, or the time, required for the melting of this current fuse, is very long.

Figure 4:
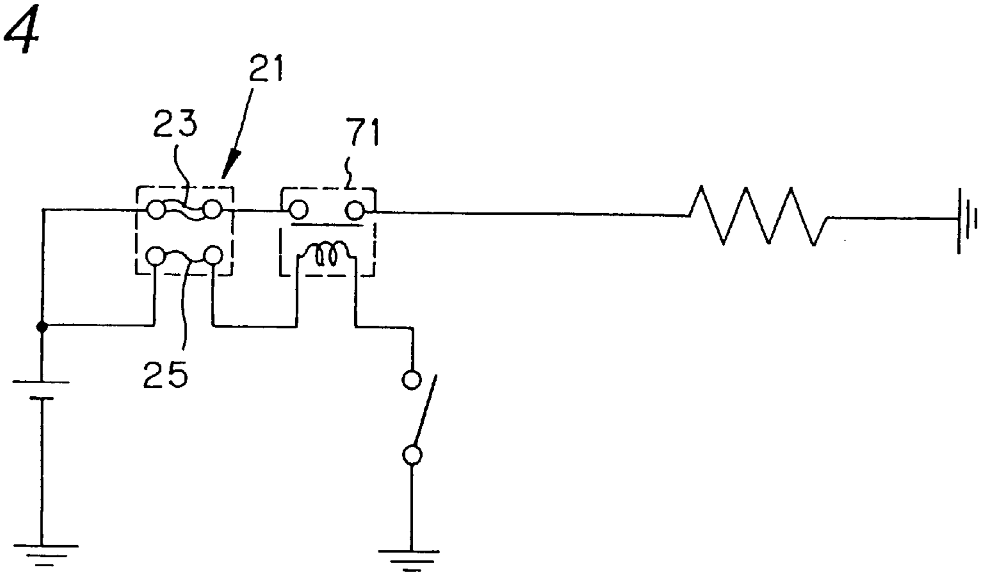
FIG. 4 is a circuit diagram showing an example of a forced breaking circuit to which the temperature detecting fuse is connected.
Figure 5:
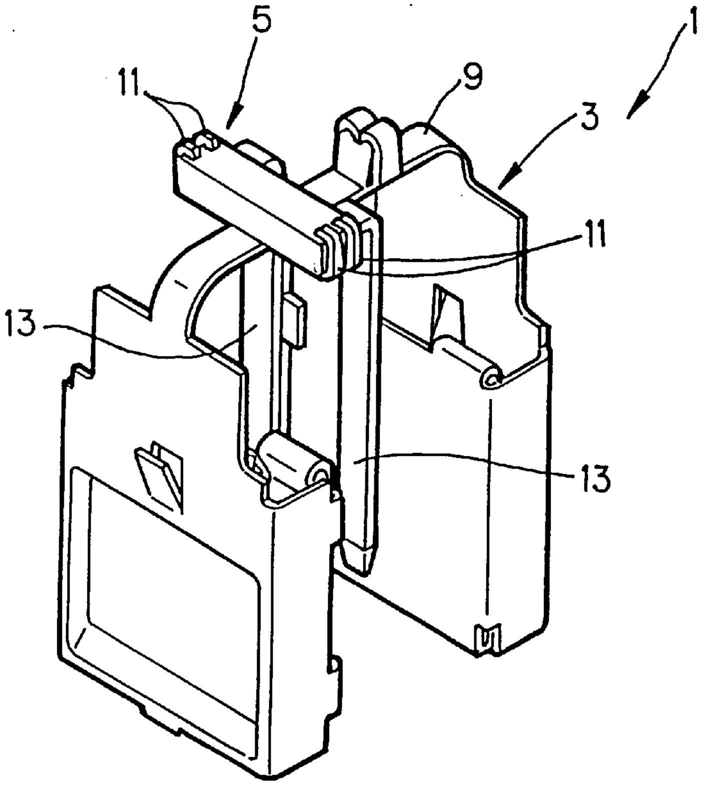
FIG. 5 PRIOR ART
FIG. 5 is a perspective view showing an essential portion of a related temperature detectable fuse.

In the temperature detectable fuse 21, the activating temperature of the temperature detecting fuse 25 is set to a suitable value less than 150° C., and by doing so, the temperature detecting fuse 25 is melted in the event of such rare short-circuiting. In accordance with this melting signal, for example, a breaker relay 71, shown in FIG. 4, is driven to break the circuit or to operate an alarm circuit so as to turn on an alarm lamp on an associated meter, thereby informing the driver of the occurrence of the abnormal condition.

As described above, in the above temperature detectable fuse 21, the table portions 37 are provided at the fuse element 31 of the current fuse 23, and therefore the fuse element 31 and the fuse wire 47 can be held in intimate contact with each other without the conducting the clamping process.

The pressing-connecting terminals 45 are of the female type, and therefore the construction of the mating fuse box can be simplified.

The temperature detecting fuse 25 is not integrally connected to the current fuse 23 by clamping, and therefore a desired temperature detecting fuse, which is separate from the current fuse 23, can be mounted in the housing each time the large-current fuse is assembled. Therefore, any one of the temperature detecting fuses 25, different in melting temperature from one another, can be used, and thus the detection temperature can be easily changed.

The temperature detecting fuse 25 can provided in the vicinity of the temperature detectable fuse 21, utilizing the housing 27 similar in construction of the related housing, and therefore the current fuse can be formed generally into the same size as that of the currently-used current fuse. As a result, the functions of the current fuse and the temperature fuse can be combined together in a compact manner with one unit.

In the above method of assembling the temperature detectable fuse 21, the current fuse 23, the temperature detecting fuse 25 and the cover 55 are sequentially mounted on the housing 27, and with this method, the fuse wire 47 can be mounted on the table portions 37 of the first-mounted current fuse 23, and is held in intimate contact therewith. Therefore, the current fuse 23 and the temperature detecting fuse 25 can be held in intimate contact with each other without conducting the clamping process.

When the cover 55 is attached to the housing, the ribs 63 retain the crimp terminals 45 of the temperature detecting fuse 25, respectively. Therefore, the force of retaining of the temperature detecting fuse 25 is increased.

If the crimp terminals 45 are half inserted in the housing, the cover 55 can not be attached to the housing. As a result, the half insertion of the temperature detecting fuse 25 can also be detected.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A temperature detectable current fuse comprising:

a temperature detecting fuse having a fusible portion;

a current fuse having a fusible portion and a table portion provided at the fusible portion thereof, on which the fusible portion of the temperature detecting fuse is mounted; and a housing having a chamber into which the temperature detecting fuse and the current fuse are inserted through an opening of the chamber.

2. The temperature detectable current fuse as set forth in claim 1, further comprises a cover detachable to the housing for closing the opening of the chamber, the cover having a fuse holder for abutting against the fusible portion of the temperature detecting fuse on the table portion of the current fuse when the cover is attached to the housing.

3. The temperature detectable current fuse as set forth in claim 1, wherein a terminal of the current fuse is a female terminal.

4. The temperature detectable current fuse as set forth in claim 1, wherein a female terminal is integrally provided with the temperature detecting fuse.

5. The temperature detectable current fuse as set forth in claim 2, wherein the cover has a rib which can be engaged with the temperature detecting fuse only when the temperature detecting fuse is completely inserted into the chamber and the cover can be attached to the housing only when the rib is engaged with the temperature detecting fuse.

6. The temperature detectable current fuse as set forth in claim 1, wherein the table portion is provided at a longitudinal end portion of a radiator fin which extends perpendicularly from the fusible portion of the current fuse.

7. A method for assembling a temperature detectable current fuse comprising the steps of:

inserting a current fuse into a chamber of a housing through an opening in the housing such that the current fuse is attached therein;

inserting the temperature detecting fuse, having at least one terminal, into the chamber through the opening such that a fusible portion thereof is mounted on a table portion of the current fuse with the terminal extending therefrom; and attaching a cover to the housing such that a fuse holder abuts against the fusible portion of the temperature detecting fuse on the table portion of the current fuse.

* * * * *